(12) United States Patent
Chung et al.

(10) Patent No.: US 11,663,910 B2
(45) Date of Patent: May 30, 2023

(54) HANDHELD LASER-BASED VEHICLE SPEED MEASUREMENT DEVICE INCORPORATING AN AUTOMATIC NUMBER PLATE RECOGNITION (ANPR) FUNCTION

(71) Applicants: Laser Technology, Inc., Centennial, CO (US); Kama-Tech (HK) Limited, Hong Kong (CN)

(72) Inventors: Ji Yoon Chung, Aurora, CO (US); Jeremy G. Dunne, Parker, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 0 days.

(21) Appl. No.: 16/688,633

(22) Filed: Nov. 19, 2019

(65) Prior Publication Data

US 2020/0160700 A1 May 21, 2020

Related U.S. Application Data

(60) Provisional application No. 62/769,803, filed on Nov. 20, 2018.

(51) Int. Cl.
*G08G 1/054* (2006.01)
*G01S 17/88* (2006.01)
*G01S 17/58* (2006.01)
*G08G 1/04* (2006.01)

(52) U.S. Cl.
CPC .............. *G08G 1/054* (2013.01); *G01S 17/58* (2013.01); *G01S 17/88* (2013.01); *G08G 1/04* (2013.01)

(58) Field of Classification Search
CPC .......... G08G 1/054; G08G 1/04; G01S 17/58; G01S 17/88; G01S 17/86
See application file for complete search history.

(56) References Cited

U.S. PATENT DOCUMENTS

| 4,025,761 | A  | 5/1977  | Hayosh et al. |
| 5,717,195 | A  | 2/1998  | Feng |
| 6,636,701 | B1 | 10/2003 | Vezard |

(Continued)

FOREIGN PATENT DOCUMENTS

EP 0680027 11/1995

OTHER PUBLICATIONS

Anonymous, "Raspberry Pi," Mar. 10, 2016, Retrieved from the Internet: https://web.archive.org/web/20160310192010/http://www.truetex.com/raspberrypi.

(Continued)

*Primary Examiner* — Michael E Teitelbaum
(74) *Attorney, Agent, or Firm* — William J. Kubida; Hogan Lovells US LLP

(57) ABSTRACT

Disclosed herein is a handheld speed gun incorporating automatic number plate recognition (ANPR) functionality. As the image size of a vehicle license plate varies depending on its distance from the speed gun, in the present invention the distance to the target vehicle is known through the functionality of the laser sensor so the size of the pixels for the number plate can be estimated. Since the image of the number plate may be tilted in a handheld device, the present invention compensates for this by use of the instrument's tilt sensor or through other compensation by use of the image itself.

16 Claims, 9 Drawing Sheets

(56) References Cited

U.S. PATENT DOCUMENTS

| | | | |
|---|---|---|---|
| 6,696,978 B2 | 2/2004 | Trajkovic | |
| 7,133,608 B1 | 11/2006 | Nagata | |
| 7,708,205 B2 | 5/2010 | Kotlarsky | |
| 7,898,745 B2 | 3/2011 | Matsui | |
| 7,920,251 B2 | 4/2011 | Chung | |
| 8,311,343 B2 | 11/2012 | Chung | |
| 8,446,467 B2 | 5/2013 | Tilton | |
| 9,247,215 B1 | 1/2016 | Athan | |
| 9,964,805 B2 | 5/2018 | Dunne | |
| 10,146,103 B2 | 12/2018 | Dunne | |
| 2002/0136150 A1 | 9/2002 | Mihara | |
| 2004/0062533 A1 | 4/2004 | Koike | |
| 2004/0101166 A1* | 5/2004 | Williams | G01P 3/38 382/104 |
| 2005/0088562 A1 | 4/2005 | Noto | |
| 2007/0154202 A1 | 7/2007 | Lee et al. | |
| 2009/0091821 A1 | 4/2009 | Regan | |
| 2009/0128934 A1 | 5/2009 | Plangger | |
| 2010/0128127 A1 | 5/2010 | Ciolli | |
| 2010/0260387 A1* | 10/2010 | Lee | G06K 9/209 382/118 |
| 2013/0038718 A1 | 2/2013 | Nakagome | |
| 2014/0063261 A1 | 3/2014 | Betensky | |
| 2014/0362231 A1 | 12/2014 | Bietsch | |
| 2014/0369566 A1 | 12/2014 | Chigos | |
| 2016/0044250 A1 | 2/2016 | Shabtay | |
| 2017/0032666 A1* | 2/2017 | Pretorius | G08G 1/04 |
| 2017/0132477 A1 | 5/2017 | Kim et al. | |
| 2017/0177965 A1 | 6/2017 | Gordo Soldevila et al. | |
| 2017/0243373 A1 | 8/2017 | Bevensee | |
| 2017/0285444 A1 | 10/2017 | Dunne | |

OTHER PUBLICATIONS

Anonymous, "960H varifocal Low Illumination HD Usb Camera USB2.0 AR0130 Sensor with IR Cut and 2.8-12 Lens," Mar. 5, 2016, Retrieved from the Internet: URL: https://web.archive.org/web/20160305064319/http://www.elpcctv.com:80/960h-varifocal-low-illumination-hd-usb-camera-usb20-a-r0130-sensor-with-ir-cut-and-2812-lens-p-2-11.html.

Extended European Search Report dated Aug. 22, 2017 in corresponding EP Patent Application No. EP 17164273.9.

International Search Report and Written Opinion corresponding to PCT/US2019/062235 dated Feb. 28, 2020.

Office Action dated Feb. 8, 2023 in related U.S. Appl. No. 17/696,624.

* cited by examiner

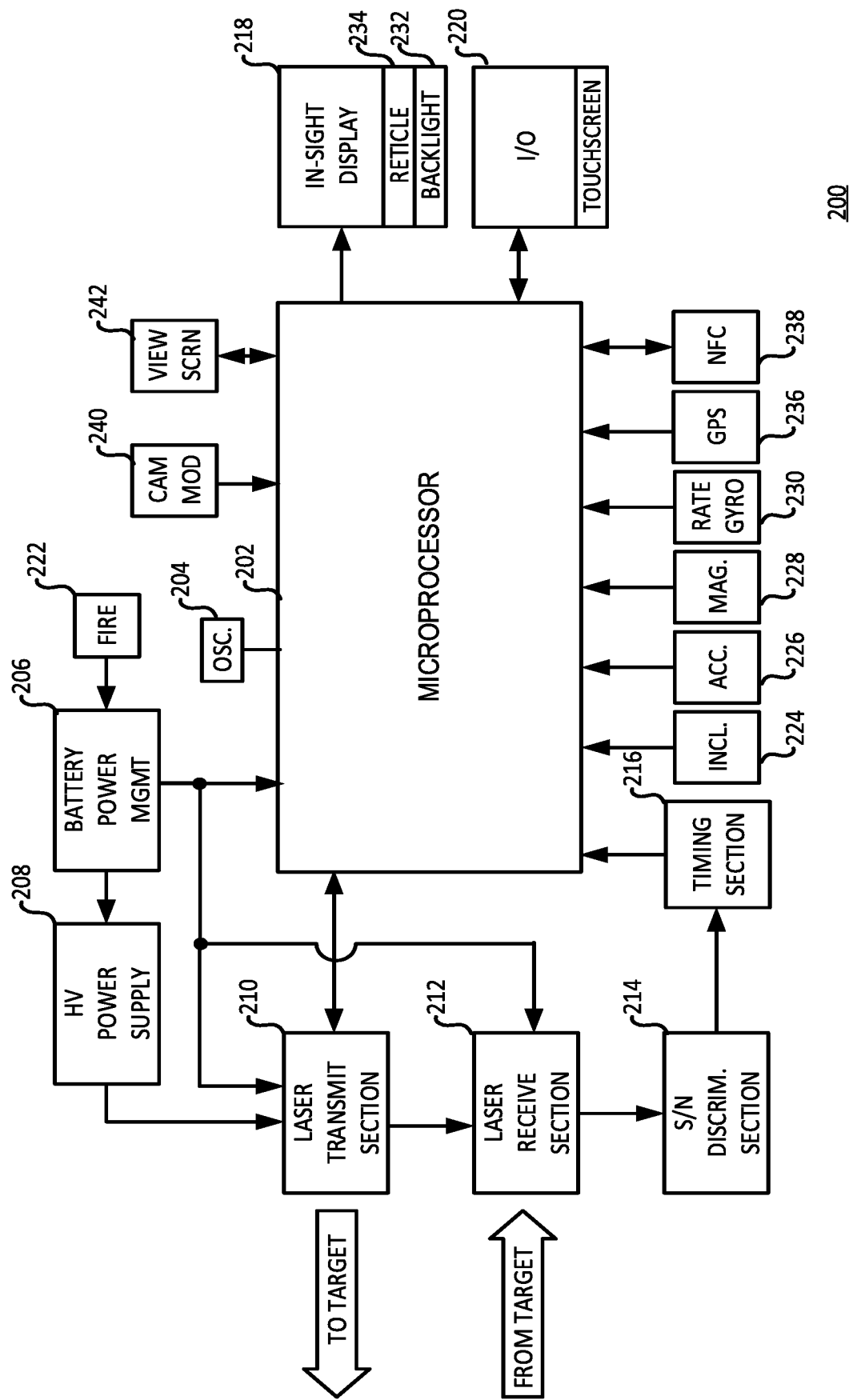

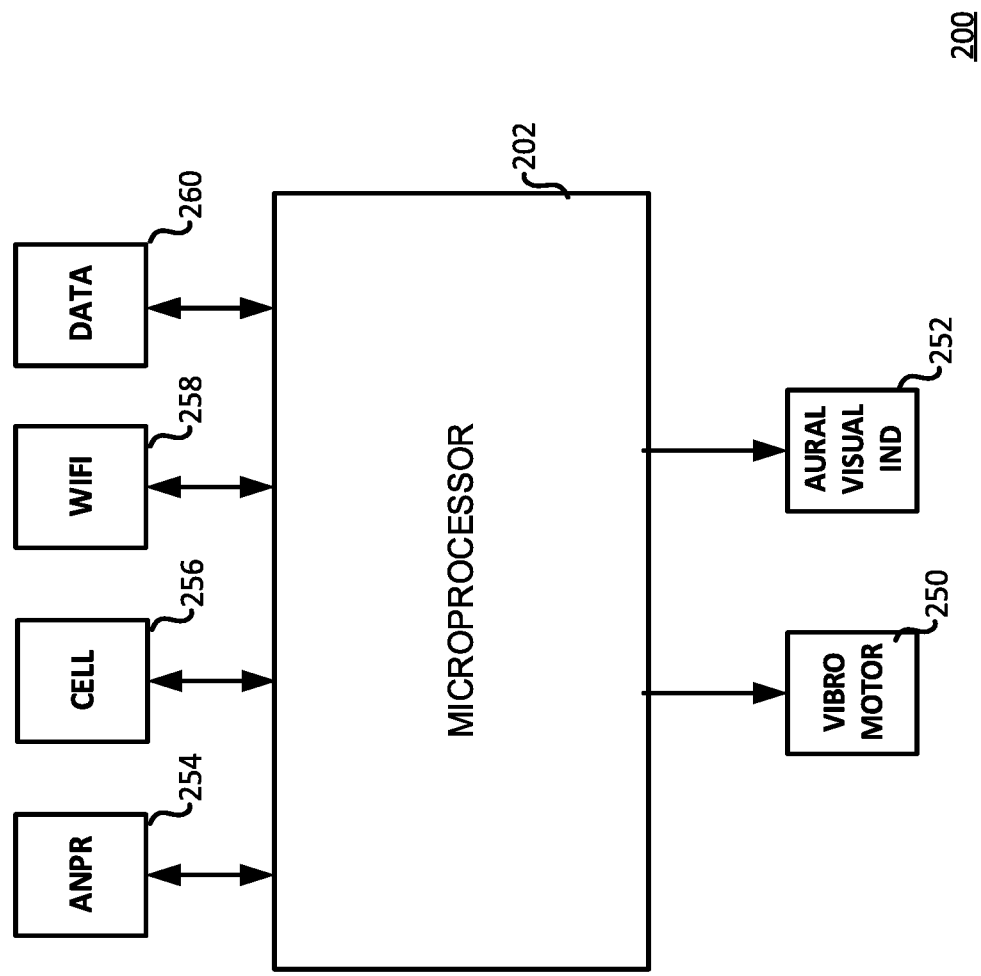

HANDHELD LASER-BASED VEHICLE SPEED MEASUREMENT DEVICE INCORPORATING AN AUTOMATIC NUMBER PLATE RECOGNITION (ANPR) FUNCTION

CROSS REFERENCE TO RELATED PATENT APPLICATIONS

The present invention is related to, and claims priority from, U.S. Provisional Patent Application Ser. No. 62/769,803 filed Nov. 20, 2018 for "Laser-Based Vehicle Speed Measurement Device Incorporating an Automatic Number Plate Recognition (ANPR) Function". The present application is also related to U.S. patent application Ser. No. 15/473,307, filed Mar. 29, 2017, for "Camera Module and Folded Optical System for Laser-Based Speed Gun," now U.S. Pat. No. 10,146,103 issued Dec. 4, 2018, and which claims priority to U.S. Provisional Application Ser. No. 62/316,319, filed Mar. 31, 2016, for "Camera Module and Folded Optical System for Laser-Based Speed Gun," the full disclosures of each of the foregoing patent applications are hereby incorporated by this reference in their entirety for all purposes.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright © 2019, Laser Technology, Inc.

BACKGROUND OF THE INVENTION

The present invention relates, in general, to the field of handheld laser-based vehicle speed measurement devices and speed guns. More particularly, the present invention relates to a handheld laser-based vehicle speed measurement device incorporating an automatic number plate recognition (ANPR) function.

Laser Technology, Inc. assignee of the present invention, has previously introduced the TruCAM® (a registered trademark of Laser Technology, Inc.) video laser-based vehicle speed measurement device which incorporates the industry's first video camera in a handheld form factor. In operation, it collects and stores a complete chain of video evidence for both speeding and tailgating violations along with a high-resolution image that identifies the vehicle make, model and license plate number. Representative of the technology embodied in the TruCAM devices is that disclosed in, for example, in U.S. Pat. No. 7,920,251 issuing Apr. 5, 2011 for: "Integrated Still Image, Motion Video and Speed Measurement System"; U.S. Pat. No. 8,311,343 issuing Nov. 13, 2013 for: "Vehicle Classification by Image Processing with Laser Range Finder" and U.S. Pat. No. 10,146,103 issuing Dec. 4, 2018 for: "Camera Module and Folded Optical System for Laser-Based Speed Gun", the disclosures of which are herein specifically incorporated by this reference in their entirety as if fully set forth herein.

Laser-based speed measurement devices, operate to calculate distance by measuring the time of flight of very short pulses of infrared light. That is, a measurement is made as to the time it takes one or more laser pulses to travel to a target vehicle and back with a precision time base. With knowledge of the constant speed of light, the distance the laser pulses have traveled can then be calculated. If the speed gun takes, for example, a thousand samples per second, its processor can compare the change in distance between successive samples and thereby calculate the speed of the target vehicle. By taking several hundred samples over the course of a fraction of a second or so, the accuracy can be extremely high.

Conventional, fixed position, automatic number plate recognition (ANPR) is a technology that uses optical character recognition on images to read vehicle registration plates to create vehicle identification data. At present, it can be implemented using closed-circuit television, fixed traffic enforcement cameras, or other cameras specifically designed for the task. ANPR is used by police forces around the world for law enforcement purposes, including to check if a vehicle is currently being sought for whatever reason, registered and/or licensed. It is also used for electronic toll collection on pay-per-use roads and as a method of cataloguing the movements of traffic, for example by highways agencies.

Automatic number plate recognition can be used to store the images captured by the cameras as well as the text from the license plate, with some configurable to store a photograph of the driver. Systems may also employ infrared lighting to allow the camera to take the picture at any time of day or night.

Heretofore, ANPR functionality has not been able to be implemented in a handheld speed measurement device, whether implemented in conjunction with radar or laser-based speed measurement devices. Particularly, all existing ANPR equipment utilize and assume predetermined geometries between the instrument and the vehicle license plate (inclusive of optical parameters and distances to plate) in order to properly function. Moreover, such existing products are not capable of accurately functioning when tilting of the device must be compensated for as in the operation of a handheld device such as a laser-based speed measurement device as disclosed herein.

SUMMARY OF THE INVENTION

Disclosed herein is a handheld speed gun incorporating ANPR functionality. As the image size of a vehicle license plate (or other uniquely identifiable alphanumeric indicia on the vehicle) varies depending on its distance from the speed gun, in the present invention the distance is known through the functionality of the laser sensor so the size of the pixels for the number plate can be estimated.

In the use of a handheld speed gun, an image of the vehicle is generally not taken as orthogonal to the camera frame. In other words, the image may be somewhat rotated (or tilted) depending on whether the operator is left or right handed. The principles of the present invention allow for this to be compensated by use of the instrument's tilt sensor or through compensation by use of the image itself. As either technique has its advantages and disadvantages, in a representative embodiment of the present invention, both techniques may be employed.

Typical low-cost cameras, such as those incorporated in "Body CAMs" and smart phones, utilize what are known as rolling shutters. Such cameras take an image line-by-line instead of the whole scene at once. On the other hand, with a conventional "wet film" a "global shutter" is employed wherein the camera shutter is mechanically opened. In contrast, modern cameras utilize an electronic shutter so a line-by-line technique is employed.

In any event, when a vehicle (or the speed gun itself) is moving the image of the vehicle license plate is at least somewhat distorted. Consequently, the technique of the present invention incorporates rolling shutter compensation and pre-processing of the license plate image.

As with any handheld device, power considerations are also important as most will be battery powered. Consequently, the processing algorithms are advantageously "lighter" and less computationally intensive. The principles of the present invention are readily implemented in a self-contained device such as an "off-line Body Cam" and may be coupled to a database to provide appropriate notice to a user of the speed gun when a "wanted" vehicle license plate is found through connection to a cellular network, WiFi connection or the like.

Particularly disclosed herein is a handheld laser-based speed gun comprising a processor and laser signal transmitting and receiving sections coupled to the processor for determining a speed of a target vehicle based on changes in distance between the speed gun and the target vehicle over time. The speed gun further comprises a camera module coupled to the processor for capturing images of the target vehicle number plate and an automatic number plate recognition (ANPR) module is also coupled to the processor in operative association with said camera module.

Also particularly disclosed herein is a method for identifying a vehicle number plate of interest with a handheld distance ranging device comprising an image sensor. The method comprises capturing an image of the vehicle number plate; compensating the captured image to account for a determined distance of the ranging device to the vehicle number plate to produce a compensated image; and determining if the compensated image resides in a database of the vehicle number plates of interest.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 2A and 2B are representative functional block diagrams of a laser-based speed gun of the preceding figure in accordance with the principles of the present invention;

DESCRIPTION OF A REPRESENTATIVE EMBODIMENT

Figure 1:
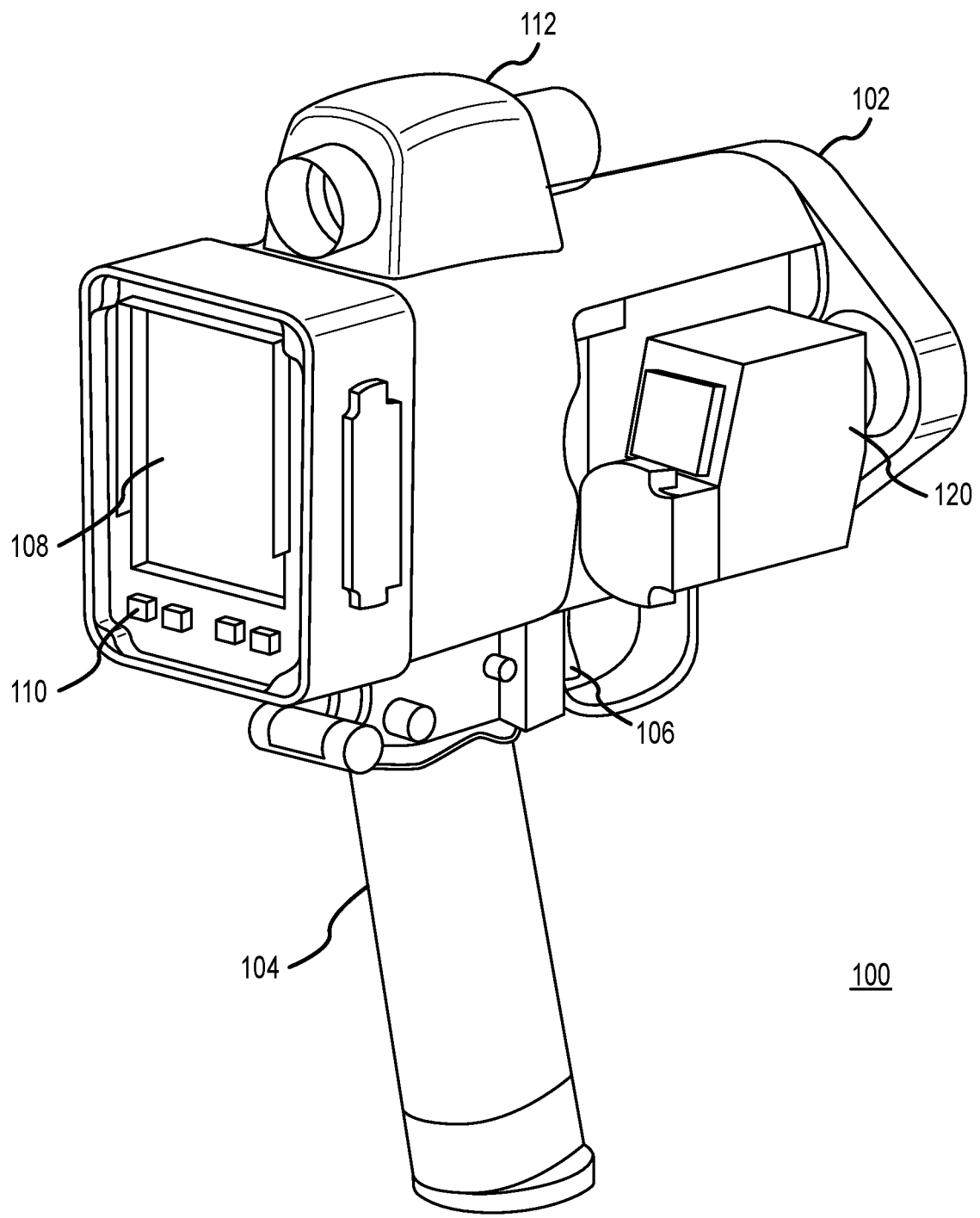
FIG. 1 is an isometric view of a representative laser-based speed gun incorporating a camera module and folded optical system incorporating an ANPR function.

With reference now to FIG. 1, an isometric view of a representative laser-based speed gun 100 is shown incorporating a camera module and folded optical system 120 incorporating an ANPR function in accordance with the principles of the present invention. The laser-based speed gun 100 comprises a housing 102 and associated handle 104 for handheld operation. A trigger 106 is provided to initiate the transmission and reception of laser pulses toward a moving object, such as a vehicle, as well as initiate the recording of video of the object in conjunction with the camera module and folded optical system 120. The laser-based speed gun 100, as illustrated, includes a display 108, user input and selection elements 110 as well as target vehicle sighting optics 112. A representative laser-based speed gun may be implemented in accordance with the disclosure of commonly owned U.S. Pat. No. 10,146,103 issuing Dec. 4, 2018 for "Camera Module and Folded Optical System for Laser-Based Speed Gun", the disclosure of which is specifically incorporated by this reference in its entirety as if fully set forth herein.

With reference now to FIG. 2A, a representative functional block diagram of the laser-based speed gun 200 of the preceding figure in accordance with the principles of the present invention is shown.

The exemplary speed gun 100 comprises a microprocessor 202 or central processing unit (CPU) with an associated oscillator 204 (where required) for providing clocking signals to the microprocessor 202. A battery and power management section 206 supplies operating power to the microprocessor 202 and various other speed gun subsystems (not shown) as well as the high voltage (HV) power supply 208 which provides operating voltage to a laser transmit section 210 and associated laser diode as well as a laser receive section 212 and associated photodiode.

The laser receive section 212 receives a portion of the laser energy transmitted by the laser transmit section 210 as reflected by a target vehicle to a photodiode and provides the return signals to a signal/noise (S/N) discriminator section 214 in order to separate true return pulses from any associated noise. A timing section 216 accurately measures the time between the transmission of laser pulses from the laser transmit section 210 and the reception of the same target vehicle reflected pulses at the laser receive section 212 to determine, in conjunction with the microprocessor 202, the varying distance, and hence the speed, of the particular target vehicle towards which the speed gun 200 is aimed.

A fire button 222 is coupled to the battery and power management section 206 and is operable by a user of the speed gun 200 in conjunction with the microprocessor 202 to determine when to emit pulses toward a target vehicle from the laser transmit section 210.

The speed gun 200 may also incorporate a user viewable in-sight display 218 implemented in conjunction with a novel and proprietary backlighting technique which may include a view of the target vehicle in conjunction with an aiming reticle as well as information regarding the range to, and/or speed of, the target vehicle, battery condition and other information. In certain embodiments, the speed gun 200 may also comprise a touchscreen display to allow user to provide inputs to the speed gun 200 in conjunction with, or as an alternative to, an input/output (I/O) section 220.

The I/O section 220 may further comprise a keypad or other means of communicating information to or from the microprocessor 202 including wired connections such as a universal serial bus (USB) and the like as well as wireless connections such as an IEEE 802.11 (WiFi), or other wireless local area network (WLAN) transceiver; a Bluetooth transceiver or other personal area network (PAN) system for wirelessly exchanging data over short distances; and/or another near field communication (NFC) transceiver (inclusive of infrared (IR) coupling) for wirelessly coupling the speed gun 200 to external devices or data storage elements.

As illustrated, the speed gun 200 may further include one or more of additional input modules such as an inclinometer 224, accelerometer, 226, magnetic sensor 228 (e.g. a compass) and/or rate gyro 230.

As an exemplary utilization of a backlighting technique for LCDs and other display devices in electronic speed guns or the present invention, the speed gun 200 is illustrated as incorporating a backlight 232. In a representative embodiment of the speed gun 200 of the present invention, the backlight 232 may be advantageously provided in accordance with the specification and teachings of commonly owned U.S. Pat. No. 9,964,805 issued on May 8, 2018 for: "Backlighting Technique for Liquid Crystal and Other Displays in Electronic Speed guns", the disclosure of which is specifically incorporated by this reference in its entirety as if fully set forth herein.

As further illustrated, the speed gun 200 may comprise a reticle 234 interposed between the backlight and the in-sight display 218 as is more fully described in the aforementioned '805 patent. A global positioning satellite (GPS) module 236 may also form a portion of the speed gun 200 to provide information to the microprocessor 202 as to the specific geographic position of the speed gun 200. In addition, and as previously noted, the speed gun 200 may further include an NFC module 238 capable of enabling external bidirectional communication with the speed gun 200 via Bluetooth, WiFi and the like in conjunction with a smartphone, tablet device, computer laptop etc.

In an alternative embodiment of the present invention, the speed gun 200 may further be configured to provide an augmented reality display to a user by the additional provision of an advanced in-scope display or camera module 240 and view screen 242. In this manner, by angularly scanning the speed gun 200 about a target vehicle, other features and objects in the surrounding scene can be displayed in the view screen 242 (or in-sight display 218 and/or the screen of an associated smartphone, tablet device or laptop) to a user of the speed gun 200 along with the determined distances to such additional features and objects to provide additional terrain context over and above the speed of, or distance to, the desired target vehicle. Such features and objects might be, depending on the particular application of the speed gun 100 trees, highway overpasses, signs, buildings and the like. The in-scope display or camera module 140 is then operational to log the surrounding features and objects, and their distances determined by the laser-based speed gun 200 and this information displayed in a picture to a user of the speed gun 200, whether on the speed gun itself or on the screen of any associated device.

With reference additionally now to FIG. 2B, an additional representative portion of the functional block diagram of the laser-based speed gun 200 of the preceding figure is shown illustrative of an embodiment of the present invention which may further include a vibro-motor 250 and one or more audio and/or visual indicators 252 to provide physical, haptic and audible and/or visible feedback to the user of a particular target vehicle number plate being of interest. A laser-based speed gun 200 in accordance with the present invention will include an ANPR function block 254 as illustrated and may further include a cellular telephony block 256 and/or WiFi block 258, and/or NFC or other communications medium, to bidirectionally communicate data regarding a vehicle's license plate number as well as speed and other information to/from a location and database remote from the laser-based speed gun 200. The ANPR function block 254 is operative in conjunction with the microprocessor 202 and the camera module 240 as will be more fully disclosed hereinafter.

A system comprising the laser-based speed gun 200 may further include a database 260 either resident in the laser-based speed gun 200 itself or remotely therefrom in communication with said laser-based speed gun 200. The database 260 may, for example, comprise number plates of particular interest to authorities which can then be matched to the number plate of a target vehicle as determined by the ANPR functionality. This information can be added to the database 260 or communicated to the operator of the laser-based speed gun 200 by haptic or aural and/or visual means by virtue of vibro-motor 250 and the aural visual indicator 252.

Figure 3:
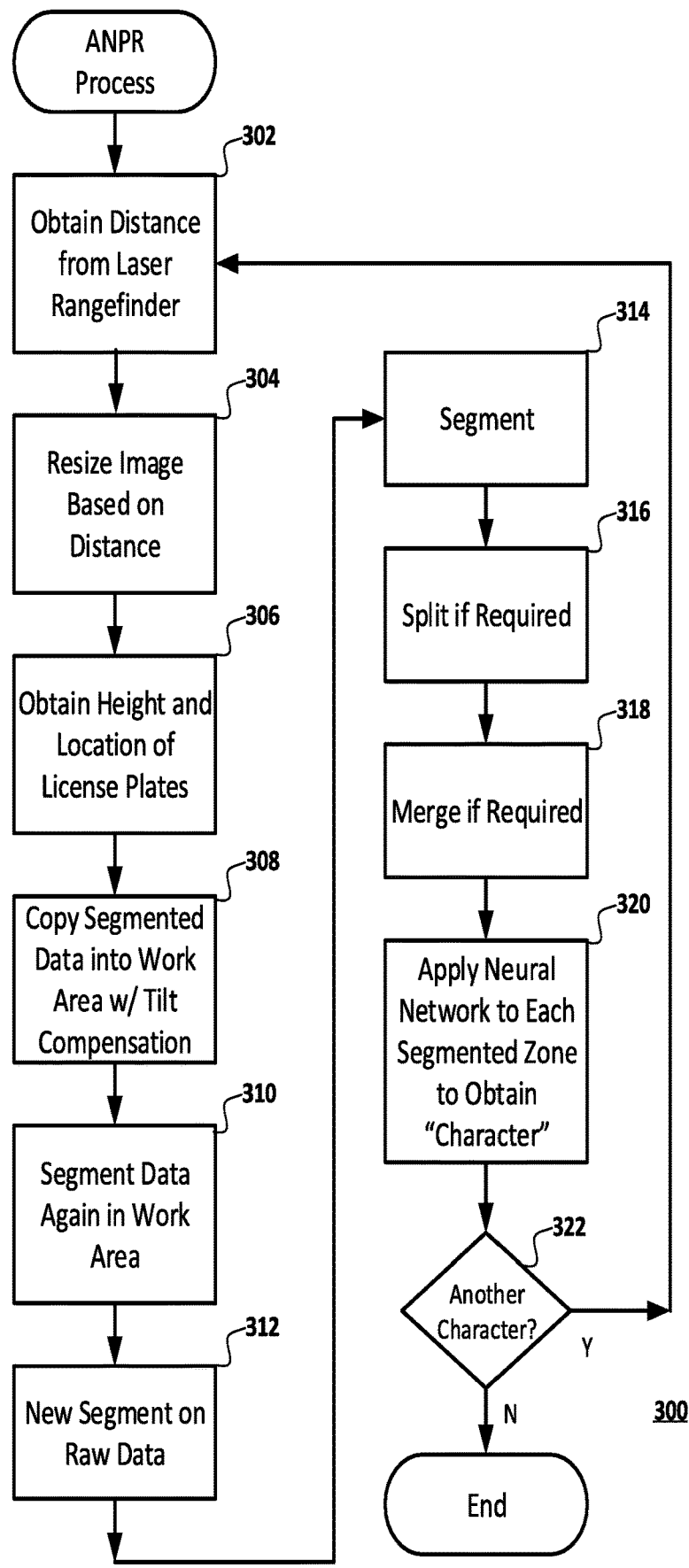
FIG. 3 is a representative flow chart of one possible implementation of a laser-based speed gun incorporating an ANPR function in accordance with the principles of the present invention.

With reference additionally now to FIG. 3, a representative flow chart of one possible implementation of a laser-based speed gun 200 incorporating an ANPR function 300 in accordance with the principles of the present invention is shown. The representative ANPR process includes determining the distance to the target vehicle license plate as determined by the laser rangefinder and as computed by the processor 202 at step 302. The speed gun 200 then computationally resizes the image of the license plate based on the computed distance at step 304.

The height and location of the license plate is then obtained at step 306 and the segmented data is then copied into the work area of the processor 202 along with tilt compensation information derived from, for example, the inclinometer 224 (FIG. 2A) as shown in step 308. At step 310, the data is once again segmented and a new segment determined on the raw data at step 312. A further segment operation is performed at step 314 and the data is split, if required, at step 316 along with a merge operation at step 318 if also required.

At this point a neural network is applied to each segmented zone in order to obtain the particular alpha or numerical character being considered at step 320. If another character of the license plate needs to be determined at decision step 322, then the ANPR process returns to step 302 to continue the ANPR function 300.

With reference now to FIGS. 4A through 4I, various views of an example license plate are shown illustrative of a representative ANPR function implemented in conjunction with a speed gun in accordance with the principles of the present invention.

Figure 4A:
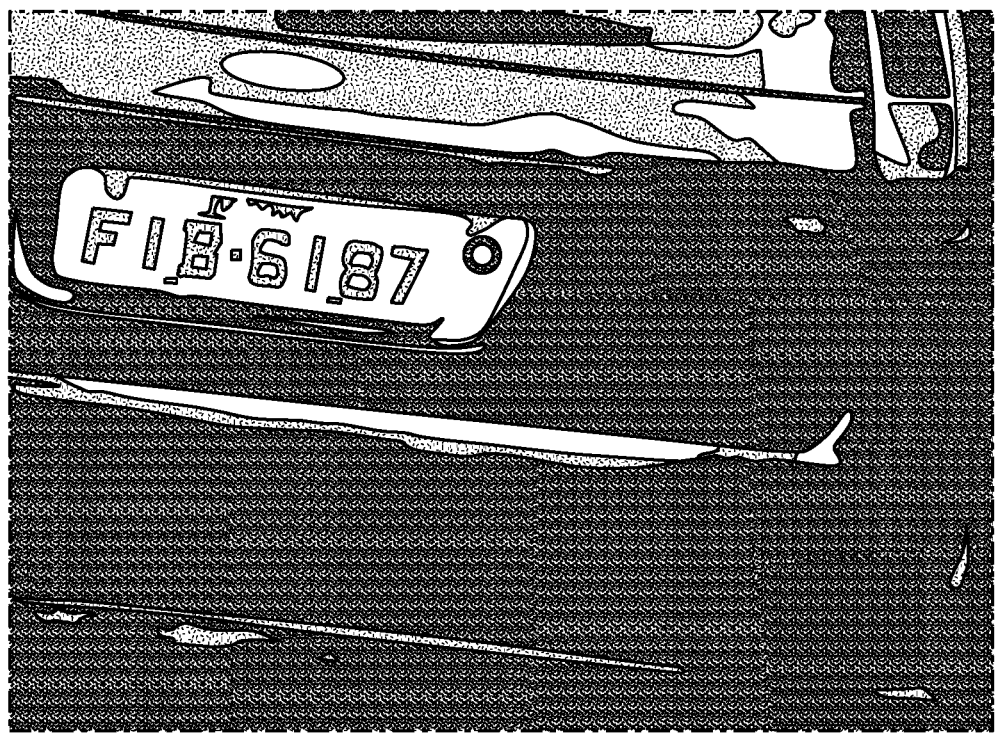
FIGS. 4A through 4I are illustrative of a representative ANPR function implemented in conjunction with a speed gun in accordance with the principles of the present invention.
Figure 4B:
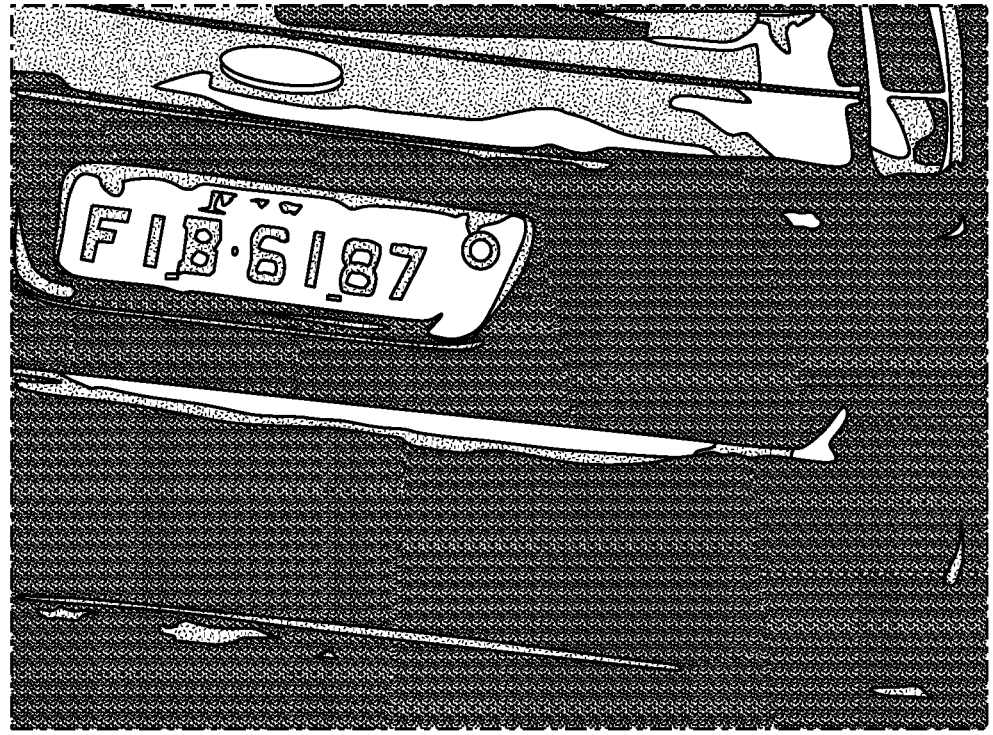

With reference specifically to FIG. 4A, a representative image of a license plate is shown. In general, the technique of the present invention performs well if the width of each character in the image is approximately 10 pixels or greater. In FIG. 4B, an average 3×3 filter is applied to the image. In the TruCam2® instrument available from Laser Technology, Inc., assignee of the present invention, this filter operation is performed by a Neon processor employing single instruction multiple data (SIMD), which employs and architecture for the ARM Cortex-A series and Cortex-R52 processors.

Figure 4C:
Figure 4D:
Figure 4E:
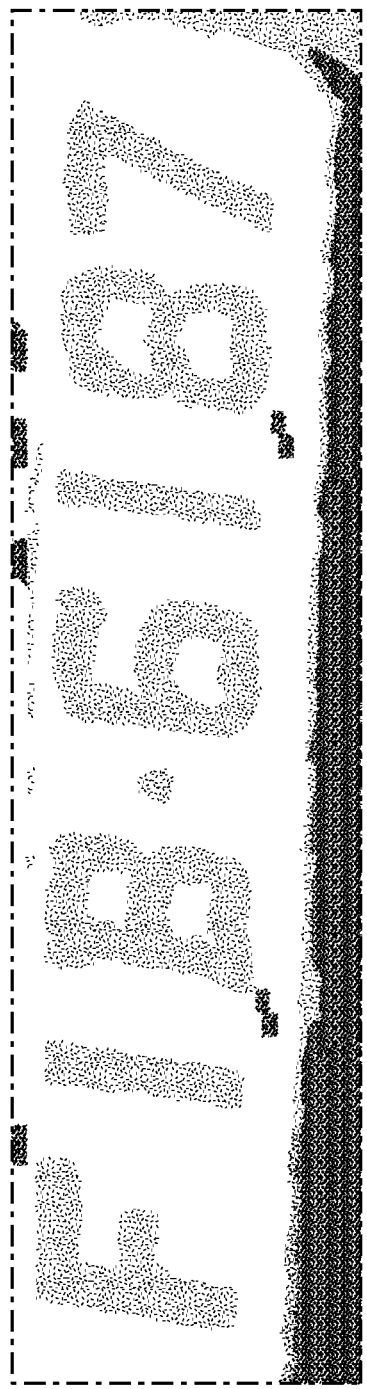

With respect to FIG. 4C, edge detection of the image is performed in the X direction only and in FIG. 4D, adjacent segments or the characters are grouped. FIG. 4E shows the license plate character candidates being grouped and tilt compensation being applied.

Figure 4F:
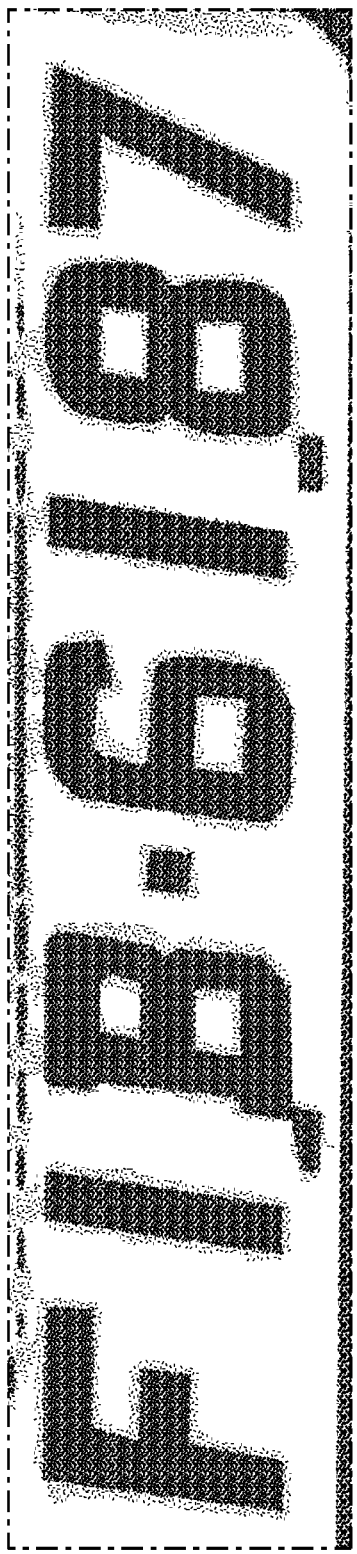
Figure 4G:
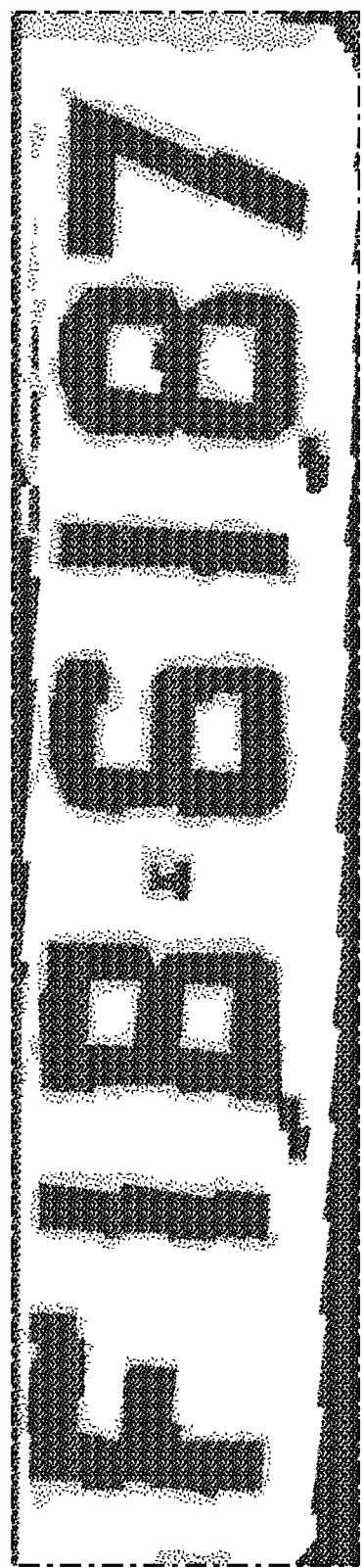
Figure 4H:
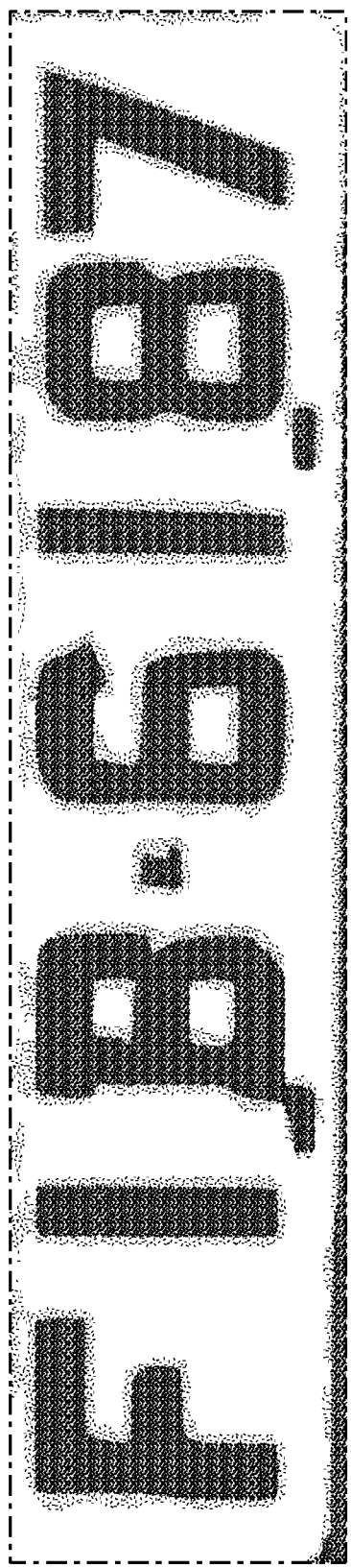
Figure 4I:
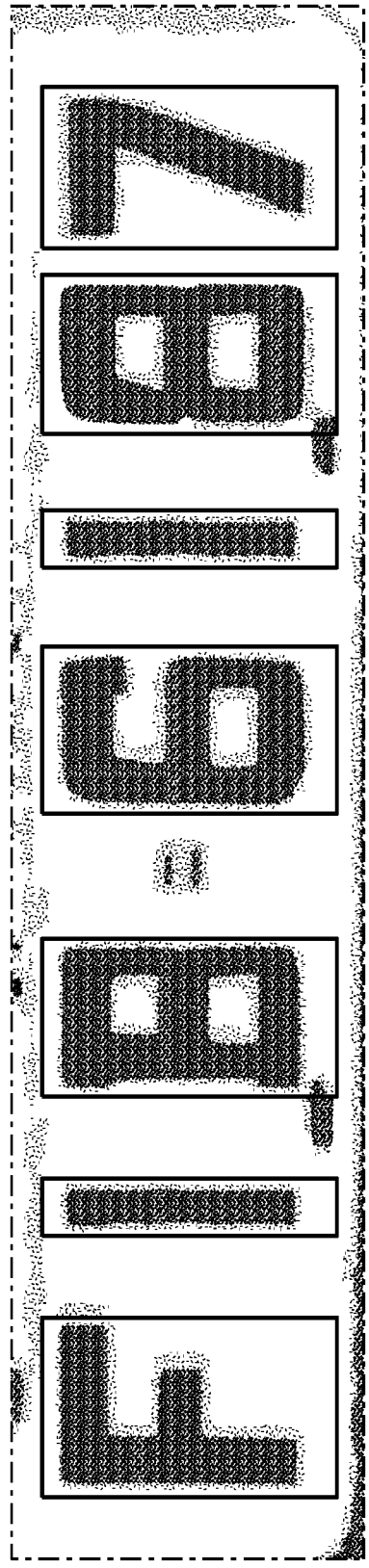

The representative license plate image is shown in FIG. 4F with anti-aliasing having been applied and, as shown in FIG. 4G, following a rolling shutter compensation operation. Anti-aliasing is then again applied as shown in FIG. 4H and the characters of the license plate segmented (after rolling shutter compensation) in FIG. 4I.

Although not specifically illustrated, the ANPR function of the preceding figures may also advantageously incorporate steps such as the trimming of the license plate characters, the application of a neural network, the retrieval of data and the application of the process with respect to license plates having two rows of alpha and numeric characters. The technique of the present invention is also applicable to those number plates having, for example, Cyrillic, Chinese, Korean, Japanese characters or Arabic alphabet representations.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A handheld laser-based speed gun comprising:
a processor;
laser signal transmitting and receiving sections coupled to said processor for determining a speed of a target vehicle based on changes in distance between said speed gun and said target vehicle over time;
a camera module coupled to said processor for capturing images of said target vehicle number plate, wherein the captured images of the target vehicle number plate comprise alphanumeric characters; and
an automatic number plate recognition (ANPR) module coupled to said processor in operative association with said camera module, wherein the distance between said speed gun and said target vehicle is utilized by the ANPR module and the processor to estimate the size of pixels in the captured images comprising alphanumeric characters.

2. The speed gun of claim 1 further comprising a folded optical system for redirecting an image pathway from said target vehicle to said camera module.

3. The speed gun of claim 1 wherein said camera module comprises an autofocus mechanism.

4. The speed gun of claim 1 wherein said distance between said speed gun and said target vehicle is utilized by said ANPR module and said processor to estimate the size of pixels in said captured images of alphanumeric characters of said target vehicle number plate.

5. The speed gun of claim 1 further comprising a tilt sensor in operative communication with said ANPR module and said processor, output of said tilt sensor being utilized to compensate for said images of said target vehicle number plate being not orthogonal to the camera frame.

6. The speed gun of claim 1 further comprising said captured images by said camera module being utilized in operative communication with said ANPR module and said processor to compensate for said images of said target vehicle number plate being not orthogonal to the camera frame.

7. The speed gun of claim 5 wherein said captured images by said camera module in conjunction with said output of said tilt sensor are both utilized to compensate for said images of said target vehicle number plate being not orthogonal to the camera frame.

8. The speed gun of claim 1 wherein said camera module is a rolling shutter device.

9. The speed gun of claim 8 wherein said camera module is operative to scan an image of said target vehicle number plate on a line-by-line basis.

10. The speed gun of claim 8 wherein said ANPR module and said processor are operative to perform rolling shutter compensation on captured images from said camera module.

11. The speed gun of claim 1 further comprising a database of vehicle number plates of interest to authorities for comparison to said captured images of said target vehicle number plate.

12. The speed gun of claim 11 wherein said database of vehicle number plates resides in a memory portion of said speed gun.

13. The speed gun of claim 11 wherein said database of vehicle number plates resides remotely from said speed gun and is bidirectionally coupled to said speed gun by a cellular network.

14. The speed gun of claim 11 wherein said database of vehicle number plates resides remotely from said speed gun and is bidirectionally coupled to said speed gun by at least one of a WiFi or NFC network.

15. The speed gun of claim 11 wherein a user of said speed gun is alerted to a match of said target vehicle number plate with a selected one of said database entries of interest to said authorities.

16. The speed gun of claim 15 wherein said user is alerted by at least one of haptic, aural or visual indicators.

* * * * *